May 20, 1958   J. BÄHR   2,835,559
APPARATUS FOR MANUFACTURE OF SULPHUR
Filed Jan. 28, 1954   2 Sheets-Sheet 1

INVENTOR.
Johannes Bähr
BY

May 20, 1958 J. BÄHR 2,835,559
APPARATUS FOR MANUFACTURE OF SULPHUR
Filed Jan. 28, 1954 2 Sheets-Sheet 2

INVENTOR.

United States Patent Office 2,835,559
Patented May 20, 1958

2,835,559

APPARATUS FOR MANUFACTURE OF SULPHUR

Johannes Bähr, Herne, Westphalia, Germany; Elfriede Ella Baehr, Else Mathilde Elisabeth Anna Kroh nee Baehr, Wilhelm Friedrich Eugen Rudolf Karl Baehr, Elisabeth Jeni Bernhard nee Baehr, Anna Mathilde Velten nee Baehr and Ernst Ludwig Baehr, heirs of said Johannes Bähr, deceased Application January 28, 1954, Serial No. 406,723

6 Claims. (Cl. 23—288)

The present invention relates to the manufacture of sulphur. More particularly, the present invention concerns the making of sulphur by the decomposition of a mixture of gases containing hydrogen sulphide and sulphur dioxide.

In processes of the above type, in order to effect a thorough conversion of the hydrogen sulphide and the sulphur dioxide to form sulphur, it is necessary to maintain a suitable temperature. Since the decomposition of hydrogen sulphide and sulphur dioxide to sulphur is exothermic, the gases are heated during the reaction and the equilibrium of the reaction is thereby displaced in an unfavorable direction, so that the gasses must be cooled after the main reaction has taken place, and the sulphur must be removed from the reaction as much as possible. The cooled gases must then be conducted again over a catalyst.

Since gases containing hydrogen sulphide are very poisonous, provision must be made for modern plants in which large quantities of hydrogen sulphide are treated to have a large reserve, in order to insure the possibility of converting the hydrogen sulphide to sulphur even when repairs are necessary or the contact or the catalyst has to be changed.

In order to take this possibility into account, the contact layers have been connected by pipes in such a manner that the gas mixture can either pass through a plurality of catalysts in succession, or when repairs are necessary, one of the catalysts is kept in operation and the other must be completely disconnected from the pipe through which the hydrogen sulphide passes. This arrangement, however, requires the use of an apparatus which is very expensive both to construct and to operate, particularly since the reversing valves must be kept at temperatures above the melting point of sulphur, in order to insure that the valve slides can be quickly changed over if necessary.

It is an object, therefore, of the present invention to provide an arrangement whereby the above disadvantages may be overcome.

It is another object of the invention to provide an apparatus wherein the contact or catalyst reaction portion of the apparatus to be repaired may be by-passed without necessitating the complete removal thereof from the apparatus.

Other objects and advantages will become apparent from the following description and the appended claims.

With the above objects in view, the present invention relates to an apparatus for manufacturing sulfur which comprises a plurality of superimposed contact layers adapted to produce sulphur from hydrogen sulphide and sulphur dioxide, conduit means for conducting a mixture of hydrogen sulphide and sulphur dioxide through the contact layers in succession, and by-pass means for conducting the mixture of hydrogen sulphide and sulphur dioxide selectively through the individual contact layers, whereby at least one of the contact layers may be by-passed during the reaction of the hydrogen sulphide and sulphur dioxide.

It has been found in accordance with the invention that the method of making sulphur described above can be greatly facilitated, and the necessary safety increased, if the conduits, through which the gases containing the hydrogen sulphide and sulphur dioxide are conducted in succession to two or more contact bodies, are arranged wholly or partly within the contact chamber or furnace.

By means of suitable arrangements, in accordance with the present invention, the gases in the conducting conduits between individual contact layers can also be cooled or heated. The cooling can be effected, for example, by spraying superheated water or liquid sulphur into these conduits. The heating can be effected by providing burners for the combustion of the hydrogen sulphide or other gases, whereby the reaction gases can be brought to the desired temperature. The regulation of the temperature can also be effected by means of built-in coolers or heaters, whereby the temperature of the gases can be raised or lowered by indirect heat transmission.

In accordance with the invention, the conversion of the hydrogen sulphide to sulphur is normally effected by burning a part of the hydrogen sulphide and conducting away the heat, for example, through a boiler. In this case, a partial current of the hot gas can also be conducted away from the boiler and can be used for heating the gas in the connecting conduit between the two contact bodies.

The novel features of the invention which are considered as characteristic for the invention are set forth in particular in the appended claims. This invention itself, however, both as to its construction and its method of operation, together with additional objects and advantages thereof, will be best understood from the following description of specific embodiments when read in connection with the accompanying drawings, in which:

Figure 1:
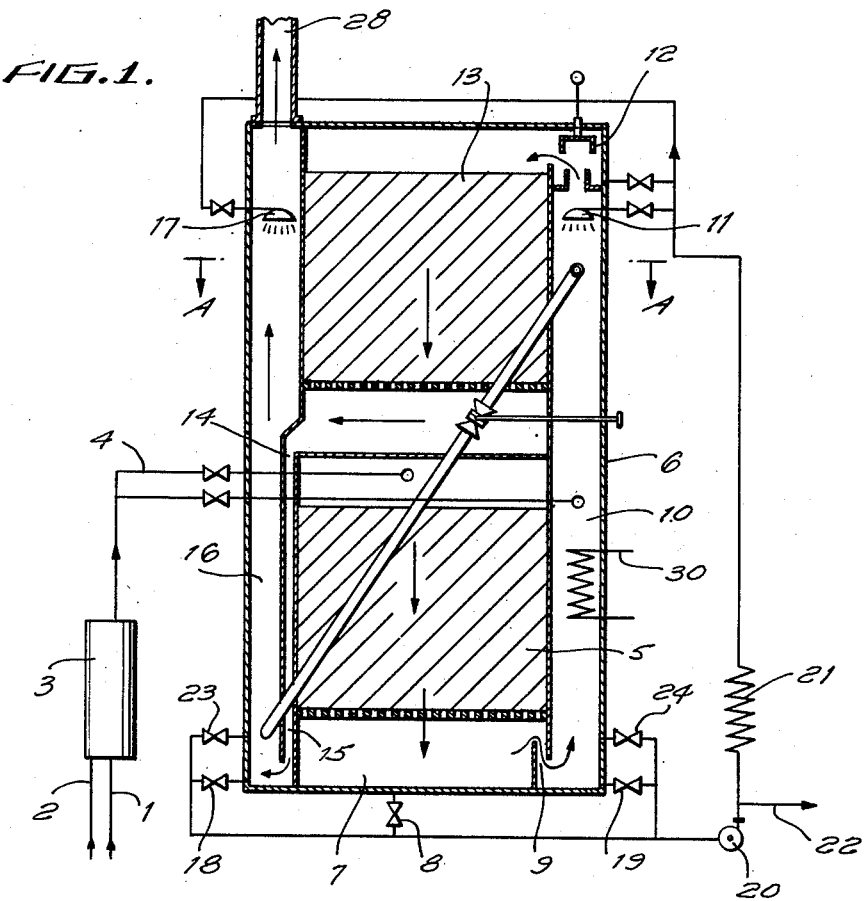
Fig. 1 is a diagrammatic view of an embodiment of the present invention showing a contact chamber having two layers of contact material through which the gases may be passed in succession.

Referring now to the drawings, and particularly to Fig. 1, there is shown an embodiment of the present apparatus showing the device with the connections arranged for normal operation, in which the gases containing hydrogen sulphide and sulphur dioxide are passed through two contact layers in succession. As shown in Fig. 1, the hydrogen sulphide passes through conduit 1 and a suitable quantity of air passes through pipe 2 into the burner of the vessel 3 in which part of the hydrogen sulphide is burned to form sulphur dioxide. The combustion gases pass through conduit 4 into the lower part 5 of contact chamber 6. The gases pass downwardly through the contact layer 5 from above, whereby most of the hydrogen sulphide and sulphur dioxide is converted to sulphur. The thus formed liquid sulphur collects on the bottom 7 of the contact chamber 6, and is drawn off by the valve 8.

The gases now pass through opening 9 into the connecting conduit 10 and flow upwardly, and in their passage upwardly are cooled by sulphur which is sprayed downwardly through nozzle 11, and the gases then flow through the opened valve 12 into the upper contact layer 13, through which the gases pass downwardly. The residual sulphur dioxide and hydrogen sulphide are thereby converted to sulphur. The gases then pass through openings 14 and 15 into the connecting conduit 16, where the gases are cooled by sulphur sprayed downwardly through nozzle 17, and the sulphur is withdrawn, e. g. through valve 18. The remainder of the gases leaves the contact chamber 6 through the chimney 28.

The sulphur which collects in liquid form at the bottom of the contact chamber is conducted away through valves 8, 18, and 19. The sulphur is cooled to the desired temperature by a cooler 21, and is returned to the circuit by a sulphur pump 20. The sulphur produced is conducted away through outlet pipe 22.

As shown in Figure 1, and as mentioned above, the gases in the connecting conduits may be heated if desired, the heating means shown in Figure 1 comprising heating coil 30 arranged in conduit 10.

By virtue of the valve arrangement shown at the bottom of the contact chamber 6, the collected liquid sulphur can be drawn off by the above described valves (which may be heated) situated near the bottom of the chamber, so that the level of the sulphur in the chamber may thereby be kept low.

The contact layers 5 and 13 mentioned above, which are also referred to herein as catalyst layers or catalysts, may be composed of any suitable inert material having a large surface area for bringing the hydrogen sulphide and sulphur dioxide gases into intimate contact with each other for producing free sulphur upon decomposition thereof. Such contact layers include such devices as Raschig rings, or may be of a carbonaceous nature, e. g., charcoal, absorbing coal, coke, etc., of varying sizes, or of silica gel.

In the process in accordance with the present invention, part of the hydrogen sulphide is burned in the presence of a suitable amount of air for producing sulphur dioxide, and a mixture of this sulphur dioxide and unburned hydrogen sulphide is brought into contact with the contact or catalyst layer as described above to form sulphur in accordance with the following process:

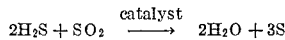

$$2H_2S + SO_2 \xrightarrow{\text{catalyst}} 2H_2O + 3S$$

Figure 2:
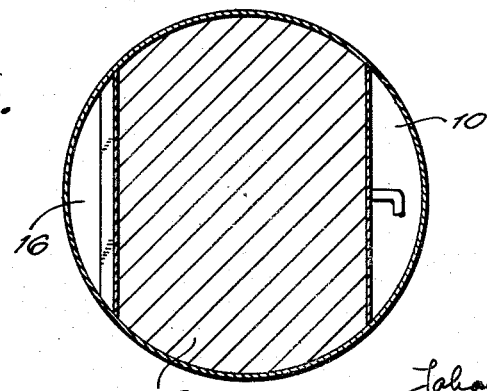
Fig. 2 is a plan view of the contact member shown in Fig. 1 taken along the line A—A.

In Figure 2 there is shown a plan view of the contact chamber illustrated in Figure 1, showing the connecting conduits 10 and 16, and the upper contact layer 13 arranged between the conduits.

Figure 3:
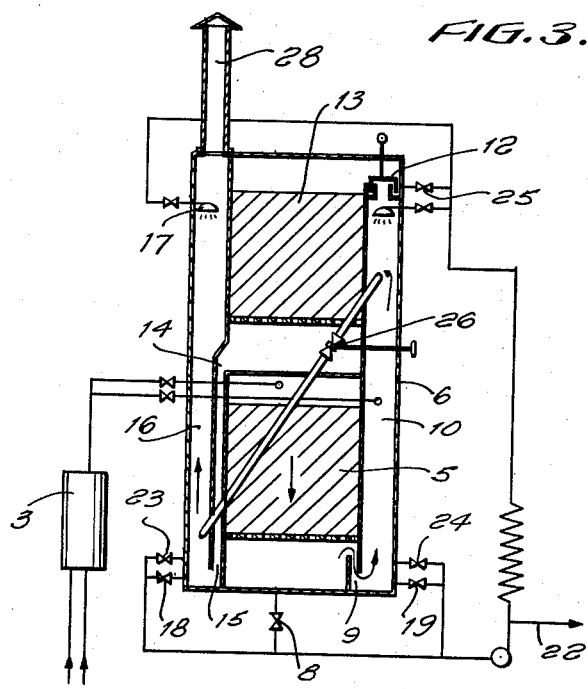
Fig. 3 is a view similar to Fig. 1, showing the connections when the gases are passed only through the lower contact layer.

Figure 3 shows the arrangement of the apparatus when only the lower contact layer 5 is to be put in operation in order to enable the upper contact layer 13 to be changed. In this case the hydrogen sulphide is burned in the manner previously described and is conducted to the lower contact layer 5.

For this purpose valve 18 is closed, and valve 23 is opened, whereas valve 19 is opened and valve 24 remains closed. Also, valve 8 is opened. The level of the sulphur in the lower part of connecting conduit 16 rises, owing to the discharge of sulphur introduced through nozzle 17, so that the opening 15 is thereby closed to the passage of gas and no gas can pass through the opening 14 into the lower part of contact layer 13. The gas passes through opening 9 into connecting conduit 10 which, however, is closed by valve 12. Valve 12 is an immersion valve which can be filled with liquid sulphur admitted by valve 25. The gas, therefore, passes through pipe 26 into the connecting conduit 16, and is cooled there by sulphur admitted through nozzle 17. The waste gas leaves the contact chamber 6 through chimney 28.

Figure 4:
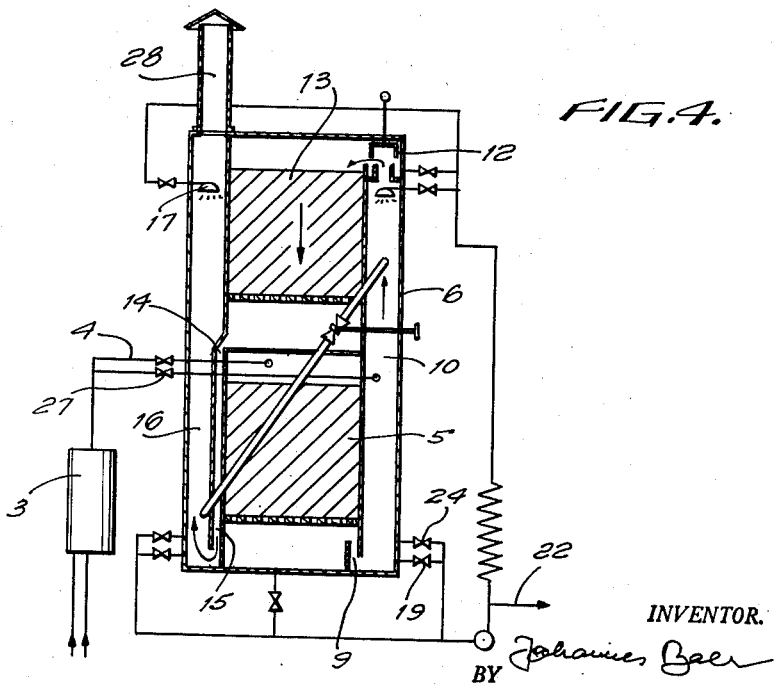
Fig. 4 is a view showing the connections when the gases are passed only through the upper contact layer.

Figure 4 shows the arrangement of the apparatus when the upper contact layer 13 only is to be put into operation, the lower contact layer 5 being out of operation, for example, for the purpose of changing the contact or catalyst thereof. The gases from vessel 3 now pass through valve 27 into conduit 10, and flow upwardly and pass through the open valve 12 into the upper contact layer 13. After flowing through contact layer 13, the gas passes through openings 14 and 15 into the connecting conduit 16. At the same time, valve 19 is closed and valve 24 opened. The sulphur, therefore, builds up in the lower part of the connecting conduit 10, and thus closes opening 9 to the passage of gases, so that lower contact layer 5 is completely disconnected. The gas in conduit 16 is now cooled with sulphur admitted through nozzle 17 and leaves the contact chamber through chimney 28.

It will be seen, by virtue of the novel construction of the apparatus above described and shown in the drawing, provision has been made for easily bypassing either one of the contact layers as desired for effecting repair or maintenance thereof, without necessitating the complete disconnection of the same from the apparatus. Since the temperature in the contact chamber 6 can easily be maintained above the melting point of the sulphur, as, for example, by the heating means described above and shown in the drawing, and large quantities of sulphur are always in circulation, a rapid changeover of the contact layers, in accordance with the invention, can be effected by suitably opening or closing the sulphur outlet valves whereby the gas conduits are closed or opened.

It will be understood that each of the elements described above, or two or more together, may also find a useful application in other types of reactions differing from the types described above.

While the invention has been illustrated and described as embodied in an apparatus for making sulphur, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Treating apparatus comprising, in combination, first and second reaction chamber means; first and second discharge passage means respectively connected to, communicating with and respectively forming outlets for said first and second reaction chamber means; first and second liquid-seal means respectively located in said first and second discharge passage means; first and second control means respectively cooperating with said first and second liquid-seal means for changing the level of a liquid at said first and second liquid-seal means between an upper level where said first and second liquid-seal means are respectively closed for respectively closing said first and second discharge passage means and a lower level where said first and second liquid-seal means are respectively open for respectively opening said first and second discharge passage means, said first and second control means being individually operable for selectively opening or closing each discharge passage means; first conduit means leading from said first discharge passage means to said second reaction chamber means for connecting said second reaction chamber means in series with said first reaction chamber means; second conduit means communicating with and leading from said second discharge passage means; by-pass conduit means connected and communicating with said first and second conduit means for leading a fluid from said first to said second conduit means without passing through said second reaction chamber means and second discharge passage means; valve means in said first conduit means between said second reaction chamber means and the connection of said by-pass conduit means with said first conduit means for cutting off or opening communication between said first and second reaction chamber means; and supply means for selectively supplying materials to be treated either to said first or to said second reaction chamber means, whereby operations may be carried on with said first and second reaction chamber means in series or selectively with either of said reaction chamber means while the non-operating reaction chamber means is completely sealed off from the operations.

2. Treating apparatus as recited in claim 1 and wherein each of said control means includes an upper valve and a lower valve, said upper valve being opened and said lower valve being closed to locate the liquid of the liquid-seal means at said upper level and said upper valve being open or closed while said lower valve is open for locating the liquid at said lower level.

3. Treating apparatus as recited in claim 1 and wherein said second reaction chamber means is located over said first reaction chamber means and said first and second conduit means extend substantially vertically and are located alongside of said first and second reaction chamber means.

4. Treating apparatus as recited in claim 3 and wherein a pair of spray means are respectively located in said first and second conduit means for spraying gases passing therethrough, the liquid of said pair of spray means settling respectively at said first and second liquid-seal means and forming the liquid of said first and second liquid-seal means.

5. Treating apparatus as recited in claim 4 and wherein a means communicates with said pair of discharge passage means and said pair of spray means for delivering liquid from said pair of discharge passage means to said pair of spray means.

6. Treating apparatus comprising, in combination, first and second contact layer means; supply means for selectively supplying a mixture of hydrogen sulfide and sulphur dioxide to said first or to said second contact layer means; first and second discharge passage means respectively communicating with and respectively forming outlets for said first and second contact layer means; first and second liquid-seal means respectively located in said first and second discharge passage means; first and second control means respectively cooperating with said first and second liquid-seal means for changing the level of liquid sulphur at said first and second liquid-seal means between an upper level where said first and second liquid-seal means are respectively closed for respectively closing said first and second discharge passage means and a lower level where said first and second liquid-seal means are respectively open for respectively opening said first and second discharge passage means, said first and second control means being individually operable for selectively opening or closing each discharge passage means; first conduit means leading from said first discharge passage means to said second contact layer means for connecting said second contact layer means in series with said first contact layer means and for conveying gaseous products formed by the reaction of said mixture in said first contact layer means to said second contact layer means; second conduit means communicating with and leading from said second discharge passage means for carrying away gaseous products formed by the reaction of said mixture in said second contact layer means; by-pass conduit means connected and communicating with said first and second conduit means for leading gaseous products from said first to said second conduit means without passing through said second contact layer means and second discharge passage means; valve means in said first conduit means between said second contact layer means and the connection of said by-pass conduit means with said first conduit means for cutting off or opening communication between said first and second contact layer means; first and second spray means respectively located in said first and second conduit means for spraying in the latter liquid sulphur which collects at said first and second liquid-seal means; and means for supplying to said first and second spray means liquid sulphur derived from said first and second discharge passage means, whereby operations may be carried on with said first and second contact layer means in series or selectively with either of said first and second contact layer means while the non-operating contact layer means is completely sealed off from the operation.

References Cited in the file of this patent

UNITED STATES PATENTS

| | | |
|---|---|---|
| 1,074,795 | Johnson | Oct. 7, 1913 |
| 1,917,689 | Baum | July 11, 1933 |
| 2,223,268 | Plummer | Nov. 26, 1940 |
| 2,438,467 | Tyson et al. | Mar. 23, 1948 |
| 2,726,933 | Merriam | Dec. 13, 1955 |

FOREIGN PATENTS

| | | |
|---|---|---|
| 879,687 | Germany | July 8, 1949 |
| 660,540 | Great Britain | Nov. 7, 1951 |